(12) United States Patent
Yang (10) Patent No.: US 7,355,761 B2
(45) Date of Patent: Apr. 8, 2008

(54) DRIVING APPARATUS AND METHOD FOR IMAGE SCANNING AND/OR FORMING MACHINE

(75) Inventor: Myung-woo Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1115 days.

(21) Appl. No.: 10/420,763

(22) Filed: Apr. 23, 2003

(65) Prior Publication Data

US 2003/0234965 A1    Dec. 25, 2003

(30) Foreign Application Priority Data

Jun. 25, 2002    (KR) .................. 10-2002-0035806

(51) Int. Cl.
*H04N 1/04*    (2006.01)
(52) U.S. Cl. ............... 358/474; 358/498; 358/496; 358/497; 399/367; 271/186; 271/114
(58) Field of Classification Search ............. 358/474, 358/498, 494, 497; 399/367, 386; 271/186, 271/114
See application file for complete search history.

(56) References Cited

U.S. PATENT DOCUMENTS

| 4,970,606 | A | * | 11/1990 | Shima | .............. | 358/474 |
| 5,956,152 | A | * | 9/1999 | Yamada et al. | .............. | 358/412 |
| 7,088,475 | B1 | * | 8/2006 | Terashima et al. | .............. | 358/448 |

FOREIGN PATENT DOCUMENTS

| JP | 1-118941 | 8/1989 |
| JP | 5-92839 | 4/1993 |
| JP | 07-298073 | 11/1995 |
| JP | 8-79439 | 3/1996 |
| JP | 10-329974 | 12/1998 |
| JP | 2001-111852 | 4/2001 |
| JP | 2002-137853 | 5/2002 |

OTHER PUBLICATIONS

Office Action dated Apr. 19, 2005 issued from the Japanese Patent Office which corresponds to Japanese Patent Application No. 2003-122105 filed on Apr. 25, 2003.

* cited by examiner

*Primary Examiner*—Douglas Q. Tran
*Assistant Examiner*—Negussie Worku
(74) *Attorney, Agent, or Firm*—Staas & Halsey LLP (57) ABSTRACT

A driving apparatus for an office machine includes a driving motor rotating in first and second directions, a power transfer part transferring a power of the driving motor to a convey unit, a document discharge unit and a document supply unit, and a controller controlling the driving motor. A driving method for the office machine includes driving the driving motor in the first direction to operate the document supply unit and the convey unit in opposite directions with respect to a document-conveying direction till a front end of a document is arranged by the convey unit after the document is supplied by the document supply unit, determining whether the front end of the document is arranged, and driving the driving motor in the second direction to convey and discharge the document through the convey unit and the document discharge unit if the front end of the document is arranged.

51 Claims, 5 Drawing Sheets

DRIVING APPARATUS AND METHOD FOR IMAGE SCANNING AND/OR FORMING MACHINE

CROSS-REFERENCE TO RELATED APPLICATIONS

This application claims the benefit of Korean Application No. 2002-35806, filed Jun. 25, 2002, in the Korean Intellectual Property Office, the disclosure of which is incorporated herein by reference.

BACKGROUND OF THE INVENTION

1. Field of the Invention

The present invention relates to driving apparatus and method for an image scanning and/or forming machine, such as an office machine including a facsimile machine, a laser printer, etc., and more particularly, to driving apparatus and method for an office machine capable of arranging front ends of sheets of paper or documents without using an extra reverse rotation prevention member or an extra power transfer member, such as a swing gear, thereby preventing a paper skew.

2. Description of the Related Art

In general, an office machine, such as a facsimile machine, a multi-function machine, etc., has a scanning device scanning data recorded on documents, a facsimile device transferring or receiving scanned data through communication lines, and a printing device printing the scanned data, the data received through the communication lines, or data inputted from a computer on sheets of paper as an output. The scanning device, which is one of constituents of the office machine, is essentially required to transfer the data recorded on the documents or print the data on the sheets of paper as the output.

Figure 1:
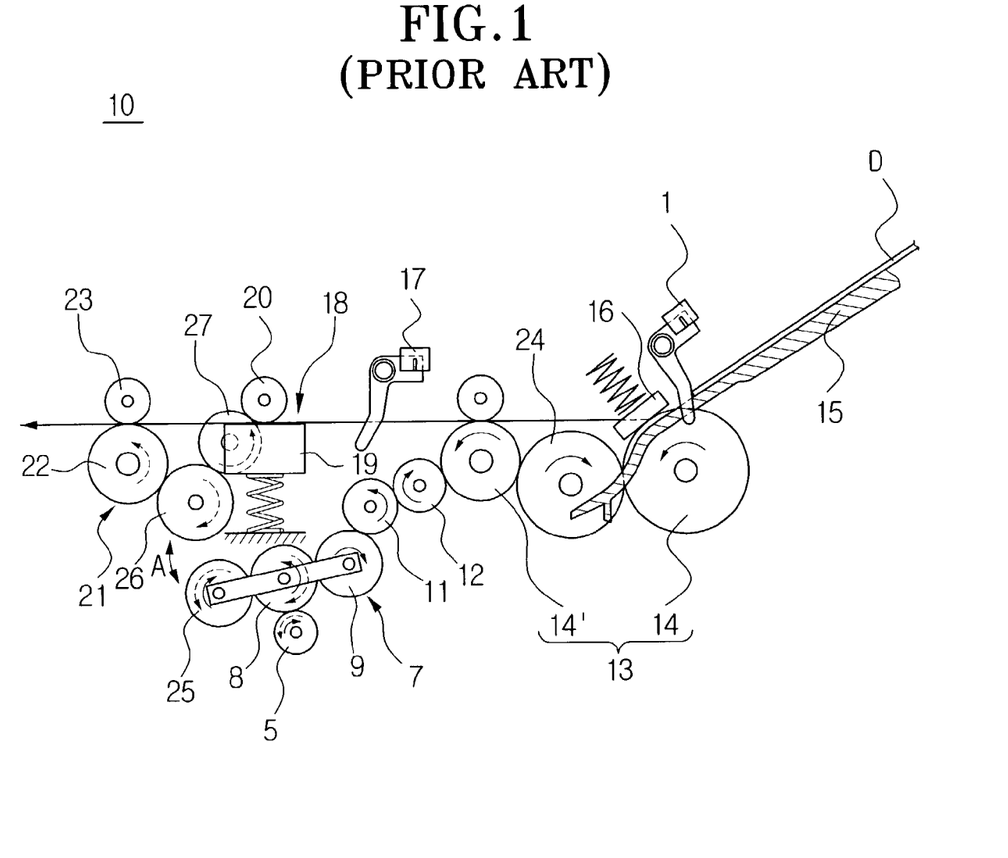
FIG. 1 is a view schematically showing a scanning device of a conventional office machine.

FIG. 1 shows a scanning device 10 applied to a general facsimile machine. The scanning device 10 includes a document supply unit 13 formed on an upper side of an apparatus to automatically supply sheets of documents D to be picked sheet by sheet, a scanner 18 reading data from the documents D delivered from the document supply unit 13, and a document discharge unit 21 discharging the documents D passing through the scanner 18 outside the apparatus.

The document supply unit 13 supplying the documents D inside the scanning device 10 is provided with a document supply tray 15 loaded with the documents D, a document sensor 1 detecting whether the documents D is loaded, a pickup roller 14 picking up the documents D according to operations of the document sensor 1, a friction pad 16 being in contact with the pickup roller 14 with a predetermined pressure to separate the documents D sheet by sheet, and a feed roller 14' conveying the documents D toward the scanner 18.

The scanner 18 includes a contact image sensor 19 reading data from the documents D delivered by a rotation force of the feed roller 14', and a white roller 20 bringing the documents D to be in contact with the contact image sensor 19.

The document discharge unit 21 has a document discharge roller 22 discharging the documents D, and a document discharge backup roller 23 coming in contact with the document discharge roller 22 with a predetermined pressure.

Further, the scanning device 10 includes a driving unit driving the pickup roller 14, feed roller 14', white roller 20, and document discharge roller 22.

The driving unit has a driving motor 5 rotating in both directions, a swing gear train 7 switching power of the driving motor 5, a first driving gear 11 meshing with a second swing gear 9 of the swing gear train 7 by the swing gear train 7 rotating in a direction of arrow A about a first swing gear 8 thereof when the driving motor 5 rotates in a clockwise direction as shown in a direction indicated in a solid line arrow of FIG. 1, a feed roller gear (not shown) connected with the first driving gear 11 through a first idle gear 12 and coaxially formed with the feed roller 14', a pickup roller gear (not shown) connected to the feed roller gear through a second idle gear 24 and coaxially formed with the pickup roller 14, a second driving gear 26 meshing with a third swing gear 25 of the swing gear train 7 by the swing gear train 7 rotating in the direction of an arrow A about the first swing gear 8 thereof when the driving motor 5 rotates in a counterclockwise direction as shown in a direction indicated in a dotted line arrow of FIG. 1, a white roller gear (not shown) connected to the second driving gear 26 through a third idle gear 27 and coaxially formed with the white roller 20, and a document discharge roller gear (not shown) connected to the second driving gear 26 and coaxially formed with the document discharge roller 22.

Operations of the conventional scanning device 10 structured above are described with reference to FIG. 1.

First, when a document D is loaded in the document supply tray 15 to convey or photocopy the document D, the document D slides down due to its weight to operate the document sensor 1. Accordingly, a controller applies electric power to the driving motor 5 to rotate the driving motor 5 in one direction, for example, in the clockwise direction as shown in the solid line arrow of FIG. 1.

As the driving motor 5 rotates in the clockwise direction, the swing gear train 7 rotates in the direction of arrow A, that is, in the counterclockwise direction about the first swing gear 8 thereof to have the second swing gear 9 of the swing gear train 7 to mesh with the first driving gear 11.

Accordingly, the feed roller 14', which is associated with the first driving gear 11, the first idle gear 12, and the feed roller gear (not shown), rotates in the counterclockwise direction, so does the pickup roller 14 associated with the feed roller 14' through the second idle gear 24 and the pickup roller gear.

Therefore, the pickup roller 14 picks up the documents D sheet by sheet by a friction force with the friction pad 16, and the feed roller 14' delivers a sheet of documents picked up by the pickup roller 14 toward a scan sensor 17.

After the scan sensor 17 is opened by a front end of the document D when the front end of the document D reaches the white roller 20 with a lapse of a predetermined time, the front end of the document D is arranged in curl by the white roller 20 which is stationary due to a cutoff of a rotation power from the swing gear train 7.

At this state, when a user presses a start button of the facsimile machine conveying or photocopying the document D, the driving motor 5 is driven in a reverse direction, that is, from the clockwise direction to the counterclockwise direction, by which the swing gear train 7 rotates in the direction of the arrow A, that is, in the clockwise direction about the first swing gear 8, and the third swing gear 25 of the swing gear train 7 is meshed with the second driving gear 26.

Accordingly, the white roller 20, which is associated with the second driving gear 26, the third idle gear 27, and the white roller gear (not shown), rotates in the clockwise direction, so does the document discharge roller 22 associated with the second driving gear 26 through the document discharge roller gear (not shown).

Therefore, the document D passes through a nip between the contact image sensor 19 and the white roller 20 by the white roller 20, and the contact image sensor 19 of the scanner 18 reads data from the document D.

As stated above, when the contact image sensor 19 of the scanner 18 completely reads out the data from the document D, the document D is discharged outside the apparatus by the document discharge roller 22.

However, the conventional scanning device 10 as described above should use a power switching member or a reverse rotation prevention member, such as the swing gear train 7 including three swing gears 8, 9, and 25 to have the white roller 20 stationary without movements so that the front ends of the documents D are arranged while preventing the documents D from being skewed, when the power of the driving motor 5 is transferred to the pickup roller 14 and the feed roller 14'. Accordingly, a problem occurs that a structure of the driving unit of the scanning device 10 becomes complicated and a manufacturing cost increases.

Further, the use of the swing gear train 7 causes a structure of the second and third swing gears 9 and 25 to move by a coupling force upon power switching operations of the driving motor 5, which generates noise as well as vibrations or malfunctions due to irregular operations. Accordingly, jitter occurs on a final image obtained upon photocopying or conveying, or a document jam occurs, and the jitter or the document jam causes a problem that lowers the product reliability.

Furthermore, when the switching gear train 7 is switched by the driving motor 5, it takes time to mesh the second and third swing gears 9 and 25 with the first and second driving gears 11 and 26 so that time for readout of the documents becomes prolonged, which causes a problem that delays photocopying or conveying times.

SUMMARY OF THE INVENTION

The present invention has been devised to solve the above and/or other problems, so it is an aspect of the present invention to provide driving apparatus and method for office machines capable of simplifying a structure thereof with a reduction of the number of constituent parts thereof.

It is another aspect of the present invention to provide driving apparatus and method for office machines capable of performing a function of arranging front ends of documents to prevent the documents from being skewed without any power switching member, such as swing gears, so that an occurrence of quality-lowering problems, such as noise, vibrations due to malfunctions, time delays, a paper jam, etc., caused by use of the power switching member is prevented, thereby enhancing product reliability.

Additional aspects and advantages of the invention will be set forth in part in the description which follows and, in part, will be obvious from the description, or may be learned by practice of the invention.

To achieve the above and/or other aspects of the present invention, a driving apparatus for an image scanning and/or forming machine, such as an office machine, includes a document supply unit picking up and supplying sheets of paper documents one by one, a convey unit conveying each document supplied by the document supply unit, a document discharge unit externally discharging the document, and a driving unit driving the document supply unit, the convey unit, and the document discharge unit. The driving unit includes a driving motor rotating in both directions, a power transfer part transferring a power of the driving motor to the respective parts to convey the document in a different direction from the document supply unit so that the convey unit and the document discharge unit have functions arranging a front end of the document, conveying the document, and discharging the document, respectively, and a controller controlling the driving motor.

According to another aspect of the invention, the power transfer part includes a first driving portion transferring the power of the driving motor to the document supply unit in order for the document supply unit to operate in a document-supplying direction so that the document is supplied each time the driving motor rotates in a first direction, a second driving portion transferring the power of the driving motor to the convey unit in order for the convey unit to operate in a direction opposite to the document-supplying direction so that the front end of the document is arranged as the driving motor rotates in the first direction and a third driving portion transferring the power of the driving motor to the document discharge unit in order for the document discharge unit to operate in the document-supplying direction so that the document is discharged as the driving motor rotates in the second direction. The power transfer part may further include a sun gear coupling the driving motor with the first, second, and third driving portions.

The document supply unit has a supply roller picking up the documents one by one, and the first driving portion has a one-way power transfer gear transferring the power in only one way coupled with the sun gear, and a supply roller gear coupled with the one-way power transfer gear and coaxially formed with the supply roller. At this time, the document supply unit further includes a pickup roller picking up the document, and the first driving portion further includes at least one first mid-coupling gear coupled with the supply roller gear in order for the pickup roller to rotate in the same direction as the supply roller and a pickup roller gear coupled with the first mid-coupling gear and coaxially formed with the pickup roller.

The convey unit includes a feed roller conveying the document conveyed by the supply roller, and an idle roller disposed to be in contact with the feed roller in a predetermined pressure, and the second driving portion includes at least one first satellite gear coupled with the sun gear and a feed roller gear coupled with the first satellite gear and coaxially formed with the feed roller.

Further, the document discharge unit includes a document discharge roller discharging the document and a backup roller being in contact with the document discharge roller with a predetermined pressure, and the third driving portion includes at least one second satellite gear coupled with the sun gear, at least one second mid-coupling gear coupled with the second satellite gear, and a document discharge roller gear coupled with the second mid-coupling gear and coaxially formed with the document discharge roller.

The controller controls the driving motor to be driven in one direction till the front end of the document is arranged by the feed roller and the idle roller of the convey unit after the documents are supplied one by one by the document supply unit, and controls the driving motor to be driven in the second direction to convey and discharge the document through the convey unit and the document discharge unit after the front end of the document is arranged. At this time, the convey unit further includes a register sensor disposed between the document supply unit and the convey unit to detect the front end of the document. It is possible that the controller determines the time to drive the driving motor in the second direction after the front end of the document is arranged, that is, a period of time lapsed after the register sensor of the convey unit is operated by the front end of the document.

According to another aspect of the present invention, the driving method for an office machine includes a document supply unit picking up and supplying sheets of paper or document one by one, a convey unit conveying the document supplied by the document supply unit, a document discharge unit externally discharging the document, a driving unit driving the document supply unit, the convey unit, and the document discharge unit and having a driving motor rotating in first and second directions, a power transfer part transferring a power of the driving motor to the respective units to convey the document in a different direction from the document supply unit so that the convey unit and the document discharge unit have functions arranging the front end of document, conveying the document, and discharging the document, respectively, and a controller controlling the driving motor. The method includes driving the driving motor in the first direction in order for the document supply unit and the convey unit to operate in directions opposite to each other with respect to a document-conveying direction till the front end of the document is arranged by the convey unit after each document is supplied by the document supply unit, determining whether the front end of the document is arranged, and driving the driving motor in the second direction to convey and discharge the document through the convey unit and the document discharge unit if the front end of the document is arranged.

According to another aspect of the invention, the deciding of whether the front end of the document is arranged includes counting time after a register sensor located between the document supply unit and the convey unit operates, and determining whether the counted time is a predetermined time.

BRIEF DESCRIPTION OF THE DRAWINGS

The above and/or other aspects and advantages of the present invention will become apparent and more readily appreciated from the following descriptions of the preferred embodiment thereof with reference to the attached drawings, in which.

DETAILED DESCRIPTION OF THE PREFERRED EMBODIMENTS

Reference will now be made in detail to the present preferred embodiment of the present invention, examples of which are illustrated in the accompanying drawings, wherein like reference numerals refer to the like elements throughout. The embodiment is described in order to explain the present invention by referring to the figures.

Hereinafter, a driving apparatus for office machines according to an embodiment of the present invention is described in detail with reference to the accompanying drawings.

Figure 2:
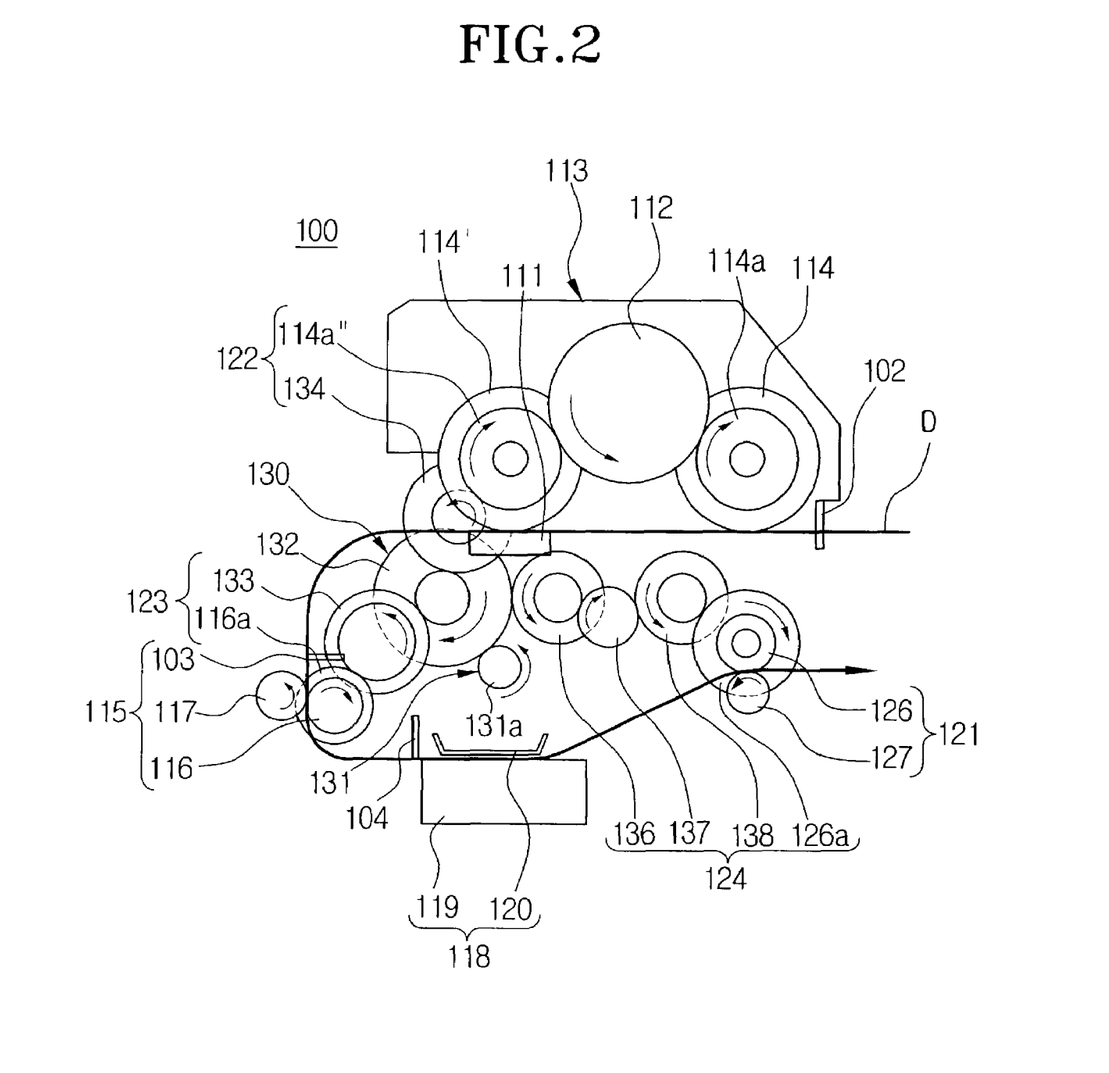
FIG. 2 is a view for schematically showing a scanning device having a driving apparatus of an office machine according to an embodiment of the present invention.

FIG. 2 schematically shows a scanning device 100 of a facsimile machine to which a driving apparatus or unit 130 is applied.

The scanning device 100 has a document supply unit 113 supplying documents D picked up sheet by sheet, a convey unit 115 conveying a document D supplied by the document supply unit 113, a scanner 118 reading data from the document D conveyed by the convey unit 115, a document discharge unit 121 externally discharging the document, and the driving unit 130 driving the document supplying unit 113, the convey unit 115, and the document discharge unit 121.

The document supply unit 113 includes a document sensor 102 detecting whether documents D are loaded in a document supply tray (not shown), a pickup roller 114 picking up a document D according to an operation of the document sensor 102, a supply roller 114' conveying the document D picked up by the pickup roller 114 toward the convey unit 115, and a friction pad 111 being in contact with the supply roller 114' with a predetermined pressure to separate the documents D sheet by sheet by a friction force.

The convey unit 115 is constructed with a register sensor 103 detecting a convey amount of the document D to arrange a front end of the document D conveyed by the supply roller 114' with respect to the scanner 118 or in a scanning direction of the scanner 118, a feed roller 116 conveying the document D, and an idle roller 117 formed of a plastic material and disposed to be in contact with the feed roller 116 with a certain pressure for arrangement and conveying of the front end of the document D.

Figure 4A:
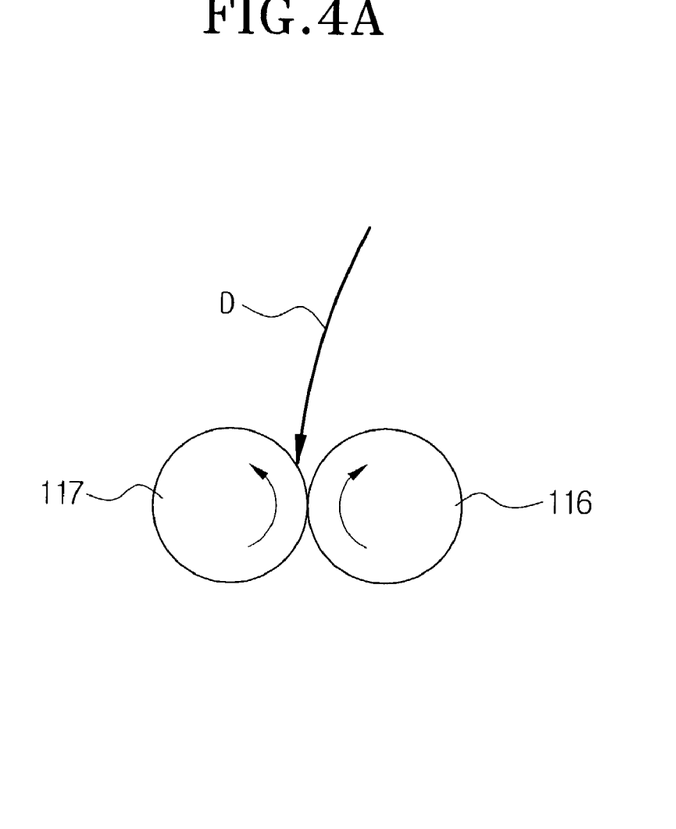
FIGS. 4A, 4B, 4C, and 4D are side views illustrating a process in which a front end of a document is arranged by a convey unit of the scanning device shown in FIG. 2.
Figure 4B:
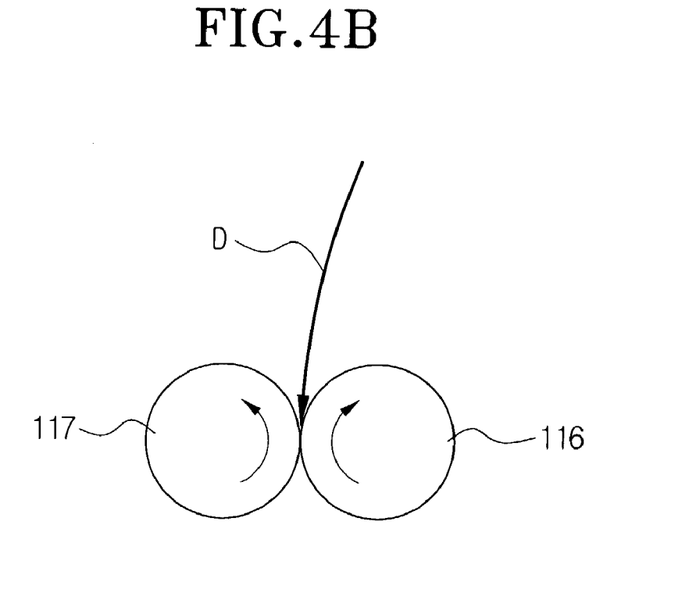
Figure 4C:
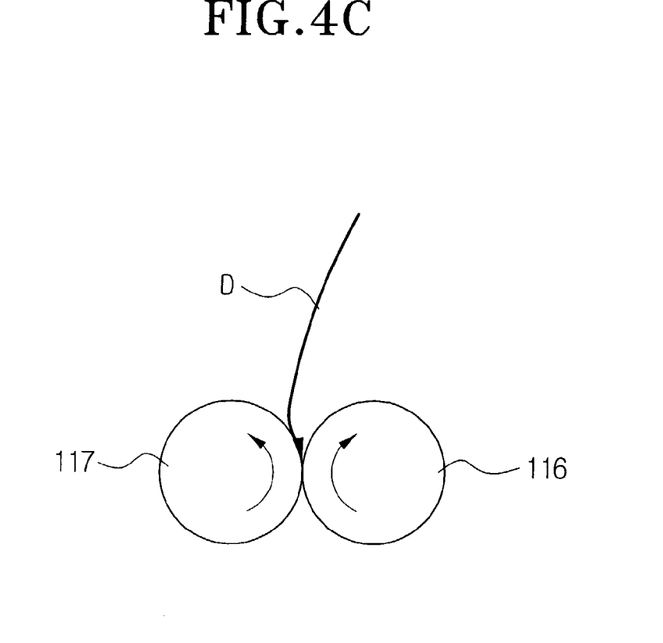
Figure 4D:
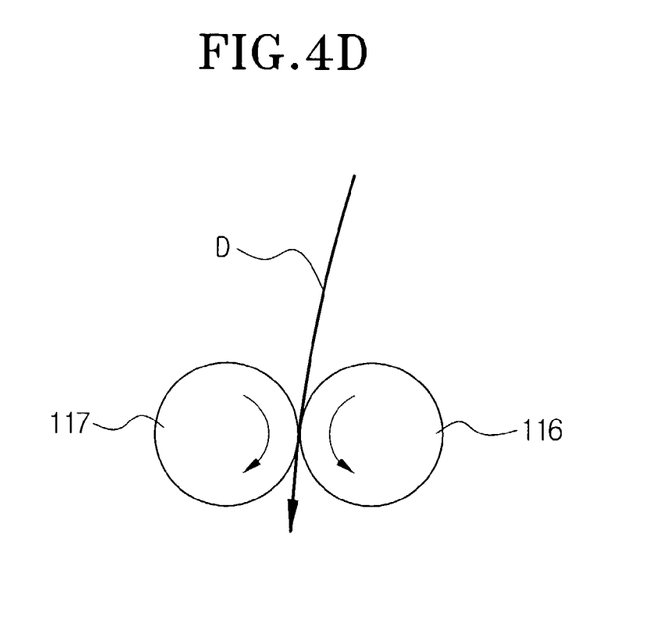

Accordingly, when the document D passes through the register sensor 103 and arrives near the feed roller 116 and idle roller 117 rotating in a direction opposite to a document supply direction in which the document D is supplied by the driving unit 130 to be described later as shown in FIG. 4A, the front end of the document D comes in contact with a circumferential surface of the idle roller 117 to be led to a nip between the feed roller 116 and the idle roller 117 as shown in FIG. 4B, is curled and arranged by a force by which the document D is conveyed as shown in FIG. 4C, and passes through the nip when the feed roller 116 reverse-rotates in the document supply direction that the document D is supplied, by the driving unit 130 as shown in FIG. 4D.

The scanner 118 is constructed with a scan sensor 104 detecting the document D conveyed by a rotation force of the feed roller 116, a charge-coupled device (CCD) 119, such as a solid state imaging device, reading data from the document D, and a white bar 120 guiding the document D to come into contact with the scanner 118. Selectively, the scanner 118 may be constructed with the contact image sensor 19 and the white roller 20 like as in a conventional scanning device 10 illustrated in FIG. 1.

The document discharge unit 121 includes a document discharge roller 126 and a document discharge backup roller 127 discharging the document D passing through the scanner 118 outside the device.

Figure 3:
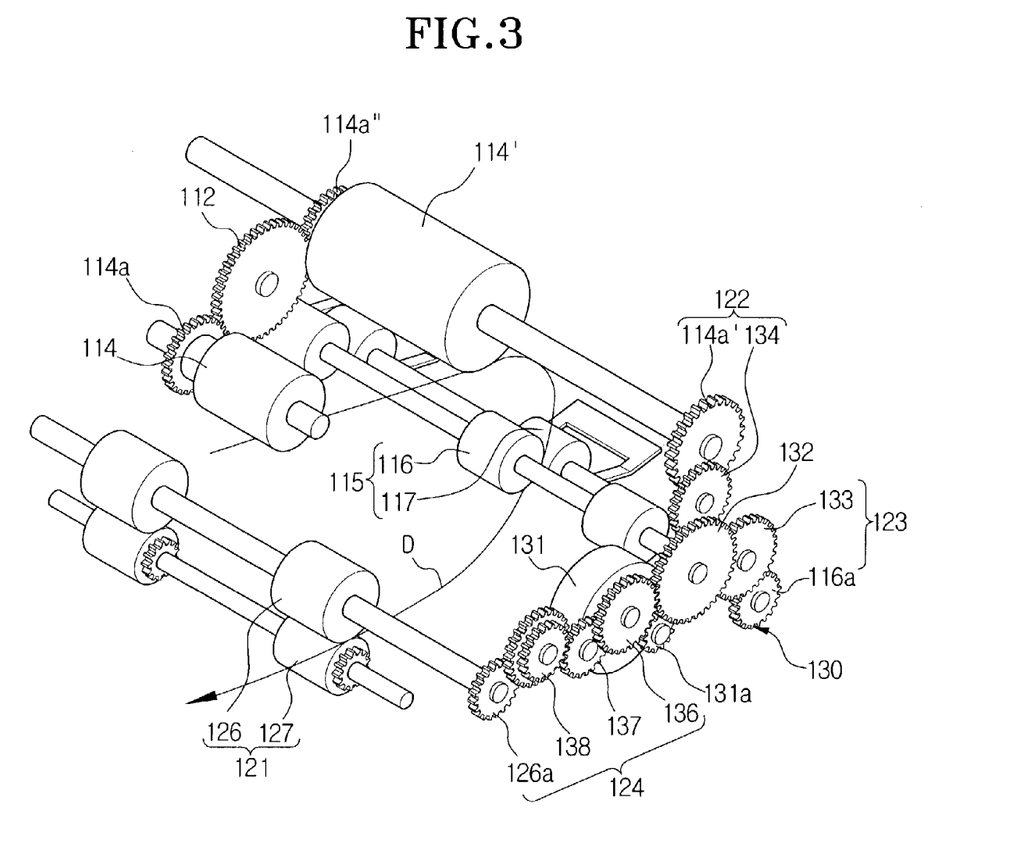
FIG. 3 is a perspective view showing the driving apparatus of the scanning device of FIG. 2.

As shown in FIG. 3, the driving unit 130 driving the pickup roller 114 and the supply roller 114' of the document supply unit 113, the feed roller 116 of the convey unit 115, and the document discharge roller 126 of the document discharge unit 121 are provided (coupled) with a driving motor 131 rotating in first and second directions, power transfer units 132, 122, 123, and 124 transferring a power of the driving motor 131 to the respective units 113, 115, and 121 so that the convey unit 115 and the document discharge unit 121 convey the document D in the direction different from that of the document supply unit 113, and a controller (not shown) controlling the driving motor 131.

The power transfer units 132, 122, 123, and 124 are constructed with a sun gear 132 connected with a power transfer gear 131*a* of the driving motor 131, a first driving portion 122 transferring the power of the driving motor 131 to the pickup roller 114 and the supply roller 114' in order for the pickup roller 114 and the supply roller 114' to rotate in the document supply direction in which the document D is supplied, that is, in a clockwise direction, as the driving motor 131 rotates in the first direction, for example, in a counterclockwise direction as shown in FIG. 2, a second driving portion 123 transferring the power of the driving motor 131 to the feed roller 116 in order for the feed roller 116 to rotate in the direction opposite to the document feeding direction in which the document D is supplied, that is, in the clockwise direction, as the driving motor 131 rotates in the counterclockwise direction so that the convey unit 115 arranges the front end of the document D, and a third driving unit 124 transferring the power of the driving motor 131 to the document discharge roller 126 in order for the document discharge roller 126 to rotate in the document supply direction, that is, in the counterclockwise direction, as the driving motor 131 rotates in the second direction, that is, in the clockwise direction, to discharge the document D.

The first driving portion 122 has a one-way power transfer gear 134, such as a latch gear, coupled with the sun gear 132 to transfer the power of the driving motor 131 only in one direction, that is, in the counterclockwise direction, and first and second supply roller gears 114*a*' and 114*a*" (refer to FIG. 3) coupled with the one-way power transfer gear 134 and coaxially formed on both sides of the supply roller 114'. The pickup roller 114 is coupled with the second supply roller gear 114*a*" through a first mid-coupling gear 112 and the pickup roller gear 114*a* coaxially formed with the pickup roller 114 in order for the pickup roller 114 to rotate together with the supply roller 114' in the same direction.

Alternatively, the one-way power transfer gear 134 is described as the latch gear in the present embodiment, but the gear 134 may be replaced with another one-way power transfer part so that the power of the driving motor 131 is not transferred to the supply roller 114' and the pickup roller 114 when the driving motor 131 rotates in the second direction, that is, in the clockwise direction, to transfer the document D.

The second driving portion 123 has a first satellite gear 133 coupled with the sun gear 132 and a feed roller gear 116*a* coupled with the first satellite gear 133 and coaxially formed with the feed roller 116.

Further, the third driving portion 124 includes a second satellite gear 136 coupled with the sun gear 132, second and third mid-coupling gears 137 and 138 coupled with the second satellite gear 136, and a document discharge roller gear 126*a* coupled with the third mid-coupled gear 138 and coaxially formed with the document discharge roller 126.

The controller controls the driving motor 131 to be driven in the first direction, that is, in the counterclockwise direction, until the front end of the document D is arranged by the feed roller 116 and the idle roller 117 of the convey unit 115 rotating in the direction opposite to the document supply direction as shown in FIG. 4C after the document D is picked up by the pickup roller 114 of the document supply unit 113 and supplied by the supply roller 114'. The controller controls the driving motor 131 to be driven in the second direction, that is, in the clockwise direction, so that the feed roller 116 and the document discharge roller 126 rotate in the document supply direction, that is, in the counterclockwise direction, to convey and discharge the document D after the front end of the document D is arranged, and the document D is scanned by the scanner 118. At this time, a time to drive the driving motor 131 in the clockwise direction after the front end of the document D is arranged is set to the time when a certain amount of curl at the front end of the document D is formed, that is, a lapse of a predetermined period of time after the register sensor 103 of the convey unit 115 is operated by the front end of the document D.

As stated above, the driving unit 130 of the scanning device 100 operates the pickup roller 114 and the supply roller 114' of the document supply unit 113 in the clockwise direction when the driving motor 131 rotates in the counterclockwise direction, and thereby the documents D are supplied sheet by sheet and the front end of the document D is arranged by the feed roller 116 and the idle roller 117 of the convey unit 115 rotating in the direction opposite to the document supply direction, that is, in the clockwise direction.

Further, as the driving motor 131 rotates in the clockwise direction with the lapse of the predetermined period of time after the register sensor 103 is operated, a power transfer from the driving motor 131 to the pickup roller 114 and the supply roller 114' of the document supply unit 113 is cut off by the one-way power transfer gear 134, and the feed roller 116 of the convey unit 115 and the document discharge roller 126 of the document discharge unit 121 are driven in the counterclockwise direction. As a consequence, the document D is conveyed toward the scanner 118 and discharged.

As illustrated and described above, the driving unit 130 of the present invention is applied only to the scanning device 100 of the facsimile machine, but the present invention may be applied to a driving unit of a printing device for the facsimile machine or a paper supply device for a printer with the same structure as the driving unit 130 to arrange a sheet of paper to be printed. The driving unit of the printing device for the facsimile machine or the paper supply device for the printer may have a developing unit or a printing head instead of the scanner 118 to print an image on the sheet.

Operations of the scanning device 100 to which the driving unit 130 structured above according to the present invention is applied will be described with reference to FIGS. 2 to 4D.

First, if documents D are loaded in the document supply tray to transfer or photocopy the documents D, the documents D slide down due to their own weight and operate the document sensor 102. As a result, the controller supplies an electric power to the driving motor 131 so that the driving motor 131 rotates in one way (first direction), for example, in the counterclockwise direction indicated in a solid line arrow of FIG. 1.

As the driving motor 131 rotates in the counterclockwise direction, the supply roller 114' rotates in the clockwise direction by the sun gear 131, one-way power transfer gear 134, and first supply roller gear 114*a*', and, accordingly, the pickup roller 114 coupled with the second supply roller gear 114*a*' through the pickup roller gear 114*a* and the first idle gear 112 also rotates in the clockwise direction.

Therefore, the pickup roller 114 picks up and conveys the documents D toward the supply roller 114', and the supply roller 114' separates and conveys the documents D sheet by sheet by the friction force with a friction pad 111 toward the register sensor 103.

When one of the documents D passes through the register sensor 103 and arrives near the feed roller 116 and the idle roller 117 as shown in FIG. 4A, the front end of the document D is led into the nip between the feed roller 116 and the idle roller 117 to be in contact with the circumferential surface of the idle roller 117 as shown in FIG. 4B.

At this time, since the feed roller 116 of the convey unit 115 rotates in the direction opposite to the document supply direction, that is, in the clockwise direction, by the feed roller gear 116a and the first satellite gear 133 coupled with the sun gear 132, the front end of the document D does not pass through the nip between the feed roller 116 and the idle roller 117, but is curled and at the same time arranged by the force by which the document D is conveyed as shown in FIG. 4C.

Thereafter, when the predetermined period of time lapses from the time the register sensor 103 operates, the controller drives the driving motor 131 in a reverse direction (second direction), that is, in the clockwise direction. Accordingly, the feed roller 116 rotates in the counterclockwise direction through the sun gear 132, the first satellite gear 133, and the feed roller gear 116a while the power transfer to the pickup roller 114 and the supply roller 114' is cut off by the one-way power transfer gear 134.

As a consequence, the document D is conveyed toward the scan sensor 104 through the nip between the feed roller 116 and the idle roller 117 as shown in FIG. 4D.

When the predetermined period of time lapses after the scan sensor 104 is operated, the document D passes through the nip between the CCD 119 and the white bar 120 of the scanner 118, and the CCD 119 of the scanner 118 reads data from the document D.

As above, when the CCD 119 of the scanner 118 completely reads data from the document D, the document D is discharged outside the scanning device 100 by the sun gear 132, the second satellite gear 136, the second and third mid-coupling gears 137 and 138, and the document discharge roller 126 rotating in the counterclockwise direction by the document discharge roller gear 126a.

As described above, the driving apparatus and the method for office machine according to the present invention perform an operation of arranging the front ends of documents without using complicated power switching members, such as swing gears, thereby reducing the number of constituent parts and simplifying the structure so that a manufacture cost is reduced, as well as preventing problems, such as noise due to the use of the complicated power switching members, vibrations due to malfunctions, time delays, jams, etc., from occurring so that product reliability is enhanced, and a quality is not lowered.

As above, a specific preferred embodiment of the present invention has been illustrated and described. However, it will be understood by those skilled in the art that the present invention should not be limited to the described preferred embodiment, but various changes and modifications can be made within the spirit and scope of the present invention as defined by the appended claims and their equivalents.

What is claimed is:

1. A driving apparatus for an image scanning or printing machine, comprising:
    a document supply unit picking up and supplying a sheet of paper in a document supplying direction;
    a convey unit conveying the sheet supplied by the document supply unit;
    a document discharge unit externally discharging the sheet; and
    a driving unit driving the document supply unit, the convey unit, and the document discharge unit,
    the driving unit comprising,
        a driving motor rotating in first and second directions,
        a power transfer part transferring a power of the driving motor to the convey and document discharge units to convey the sheet in a different direction from the document-supplying direction of the document supply unit so that the convey unit and the document discharge unit have functions of arranging a front end of the sheet with respect to the document-supplying direction and conveying the sheet, and discharging the sheet, respectively,
        wherein the driving motor rotates in the first direction to operate a pickup roller and a supply roller of the document supply unit, and power is transferred from the pickup roller and supply roller to drive a feed roller of the convey unit and a document discharge roller of the document discharge unit in the second direction without physically disengaging driving gears, and
        a controller controlling the driving motor.

2. The driving apparatus as claimed in claim 1, wherein the power transfer part comprises:
    a first driving portion transferring the power of the driving motor to the document supply unit to enable the document supply unit to operate in the document-supplying direction so that the sheet is supplied when the driving motor rotates in the first direction;
    a second driving portion transferring the power of the driving motor to the convey unit to enable the convey unit to operate in the different direction opposite to the document-supplying direction so that the front end of the sheet is arranged when the driving motor rotates in the first direction; and
    a third driving portion transferring the power of the driving motor to the document discharge unit to enable the document discharge unit to operate in the document-supplying direction so that the sheet is discharged as the driving motor rotates in the second direction.

3. The driving apparatus as claimed in claim 2, wherein the power transfer part further comprises:
    a sun gear coupling the driving motor with the first, second, and third driving portions.

4. The driving apparatus as claimed in claim 3, wherein:
    the document supply unit comprises,
        a supply roller picking up the sheets one by one; and
    the first driving portion comprises,
        a one-way power transfer gear transferring the power of the driving motor in only one way to the document supply unit coupled with the sun gear, and
        a supply roller gear coupled with the one-way power transfer gear and coaxially formed with the supply roller.

5. The driving apparatus as claimed in claim 4, wherein:
    the document supply unit further comprises,
        a pickup roller picking up the sheet; and
    the first driving portion further comprises,
        at least one first mid-coupling gear coupled with the supply roller gear to enable the pickup roller to rotate in the same direction as the supply roller, and
        a pickup roller gear coupled with the first mid-coupling gear and coaxially formed with the pickup roller.

6. The driving apparatus as claimed in claim 5, wherein:
    the convey unit comprises,
        a feed roller conveying the sheet conveyed by the supply roller, and
        an idle roller disposed to be in contact with the feed roller with a predetermined pressure; and the second driving portion comprises,
  at least one first satellite gear coupled with the sun gear, and
  a feed roller gear coupled with the first satellite gear and coaxially formed with the feed roller.

7. The driving apparatus as claimed in claim 6, wherein:
the document discharge unit comprises,
  a document discharge roller discharging the document, and
  a backup roller being in contact with the document discharge roller with a predetermined pressure; and
the third driving portion comprises,
  at least one second satellite gear coupled with the sun gear,
  at least one or more second mid-coupling gear coupled with the second satellite gear, and
  a document discharge roller gear coupled with the second mid-coupling gear and coaxially formed with the document discharge roller.

8. The driving apparatus as claimed in claim 7, wherein the controller controls the driving motor to be driven in the first direction till the front end of the sheet is arranged by the feed roller and the idle roller of the convey unit after the sheet is supplied by the document supply unit, and controls the driving motor to be driven in the second direction to convey and discharge the sheet through the convey unit and the document discharge unit after the front end of the sheet is arranged.

9. The driving apparatus as claimed in claim 8, wherein the convey unit further comprises a register sensor disposed between the document supply unit and the convey unit to detect the front end of the sheet, and the controller determines a time to drive the driving motor in the second direction when the front end of the sheet is arranged by a period of time lapse after the register sensor of the convey unit is operated by the front end of the sheet.

10. A driving method for an image scanning or printing machine having a document supply unit picking up and supplying a sheet of paper in a document-conveying direction, a convey unit conveying the sheet supplied by the document supply unit, a document discharge unit externally discharging the sheet, and a driving unit having a driving motor rotating in first and second directions, a power transfer part transferring a power of the driving motor to operations of arranging the front end of the sheet and conveying the sheet, and discharging the document, respectively, the driving unit driving the document supply unit, the convey unit, and the document discharge unit, the method comprising:
  driving the driving motor in the first direction to enable the document supply unit and the convey unit to operate in directions opposite to each other with respect to the document-conveying direction till a front end of the sheet is arranged by the convey unit after the sheet is supplied by the document supply unit;
  determining whether the front end of the sheet is arranged with respect to the document-conveying direction; and
  driving the driving motor in the second direction to convey and discharge the sheet through the convey unit and the document discharge unit if the front end of the sheet is arranged with respect to the document-conveying direction,
  wherein the driving motor rotates in the first direction to operate a pickup roller and a supply roller of the document supply unit, and power is transferred from the pickup roller and supply roller to drive a feed roller of the convey unit and a document discharge roller of the document discharge unit in the second direction without physically disengaging driving gears.

11. The driving method as claimed in claim 10, wherein the determining of whether the front end of the sheet is arranged comprises:
  counting time after the register sensor located between the document supply unit and the convey unit operates in response to a presence of the sheet; and
  determining whether the counted time is a predetermined time.

12. A driving apparatus for an image scanning/forming machine, comprising:
  a document supply unit picking up and supplying a sheet along a path in a sheet supplying direction;
  an image scanning and/or printing unit scanning/printing an image from/on the sheet supplied along the path from the sheet supply unit in the sheet supplying direction; and
  a convey unit disposed between the document supply unit and the image scanning and/or printing unit, preventing a front end of the sheet from being fed to the image scanning/printing unit for a period of time to arrange the front end of the sheet with respect to the path, and feeding the sheet to the image scanning and/or printing unit after the period,
  wherein a driving motor rotates in a first direction to operate a pickup roller and a supply roller of the document supply unit, and power is transferred from the pickup roller and supply roller to drive a feed roller of the convey unit and a document discharge roller of a document discharge unit in a second direction without physically disengaging driving gears.

13. The driving apparatus as claimed in claim 12, wherein the convey unit prevents the front end of the sheet from passing through the convey unit while the document supply unit supplies a rear end of the sheet to the convey unit along the path in the sheet supplying direction.

14. The driving apparatus as claimed in claim 13, wherein the convey unit causes the sheet to be curled with respect to the path.

15. The driving apparatus as claimed in claim 14, wherein the convey unit causes the front end of the sheet to be arranged with respect to the path when the sheet is curled.

16. The driving apparatus as claimed in claim 12, wherein the convey unit pushes the front end of the sheet back in a direction opposite to the sheet supplying direction.

17. The driving apparatus as claimed in claim 12, wherein the sheet has a first length and is disposed in a portion of the path having a second length shorter than the first path.

18. The driving apparatus as claimed in claim 17, wherein the sheet is bent with respect to the path when being prevented from passing through the convey unit.

19. The driving apparatus as claimed in claim 17, wherein a portion of the sheet is not disposed on the path.

20. The driving apparatus as claimed in claim 17, wherein the front end and a rear end of the sheet are disposed on the path.

21. The driving apparatus as claimed in claim 20, wherein the portion of the sheet is closer to the front end of the sheet than the rear end of the sheet.

22. The driving apparatus as claimed in claim 21, wherein the portion of the sheet is curved between the front end and the rear end.

23. The driving apparatus as claimed in claim 22, wherein the curved portion of the sheet generates a force to arrange the front end of the sheet with respect to the path.

24. The driving apparatus as claimed in claim 23, wherein the front end of the sheet is arranged in the path to be perpendicular to the sheet supplying direction.

25. The driving apparatus as claimed in claim 17, wherein the sheet is not disposed to be parallel to the path when the convey unit prevents the sheet from passing through the convey unit.

26. The driving apparatus as claimed in claim 25, wherein the sheet becomes parallel to the path when the convey allows the sheet to pass through the convey unit.

27. The driving apparatus as claimed in claim 17, wherein the sheet is disposed on another portion of the path having the first length when the convey unit allows the sheet to pass through the convey unit.

28. The driving apparatus as claimed in claim 27, wherein the path is disposed in the convey unit, and the another portion of the path is disposed in the convey unit.

29. The driving apparatus as claimed in claim 27, wherein the another portion of the path is disposed between the convey unit and the scanning/printing unit.

30. The driving apparatus as claimed in claim 17, wherein the portion of the path is disposed between the convey unit and the document supply unit.

31. The driving apparatus as claimed in claim 17, wherein the portion of the path has a first end disposed at the convey unit and a second end disposed toward the document supply unit.

32. The driving apparatus as claimed in claim 12, wherein the document supply unit stops supplying the sheet to the convey unit when the convey unit feeds the sheet to the scanning/printing unit.

33. The driving apparatus as claimed in claim 12, wherein the convey unit comprises:
   a feed roller rotating in a first direction to prevent the sheet from being fed in the sheet supplying direction to the scanning/printing unit for the period.

34. The driving apparatus as claimed in claim 33, wherein the feed roller of the convey unit rotates in a second direction to allow the sheet to be fed to the scanning/printing unit after the period.

35. The driving apparatus as claimed in claim 33, wherein the convey unit comprises an idle roller rotated by a rotation force of the feed roller and forming a nip with the feed roller, and the feed roller and the idle roller rotate in the first and second directions, respectively, so that the sheet is prevented from being fed through the nip.

36. The driving apparatus as claimed in claim 35, wherein the feed roller and the idle roller rotate in the second and first directions, respectively, so that the sheet is fed to the scanning/printing unit through the nip.

37. The driving apparatus as claimed in claim 35, wherein the convey unit comprises a resistor sensor disposed upstream the path with respect to the feed roller to detect the front end of the sheet, and the feed roller of the convey unit rotates in the first direction when the resister detects the front end of the sheet.

38. The driving apparatus as claimed in claim 35, wherein a rotation direction of the feed roller of the convey unit is changed from the first direction to the second direction the period after the resistor sensor detects the front end of the sheet.

39. The driving apparatus as claimed in claim 38, wherein the document supply unit stops supplying the sheet toward the convey unit a second period after the resistor sensor detects the front end of the sheet.

40. The driving apparatus as claimed in claim 33, wherein the image scanning/forming machine comprises a motor, and the document supply unit comprises:
   a pickup roller picking up the sheet; and
   a one way power transfer gear connected to the motor to rotate the pickup roller in the sheet supplying direction.

41. The driving apparatus as claimed in claim 40, wherein the document supply unit comprises:
   a supply roller supplying the picked-up sheet to the convey unit.

42. The driving apparatus as claimed in claim 41 wherein the pickup roller and the supplying roller rotate in the same direction to feed the sheet along the path in the sheet supplying direction.

43. A driving apparatus for an image scanning and/or forming machine, comprising:
   a document supply unit having a pickup roller picking up and supplying a sheet along a path in a sheet supplying direction;
   a discharge unit discharging the sheet fed along the path;
   a convey unit disposed between the document supply unit and the discharge unit, and having a feed roller feeding the sheet toward the discharge roller; and
   a control unit controlling the feed roller of the convey unit to rotate in first and second directions and controlling the pickup roller of the document supply unit to rotate in one of first and second directions,
   wherein a driving motor rotates in the first direction to operate a pickup roller and a supply roller of the document supply unit, and power is transferred from the pickup roller and supply roller to drive a feed roller of the convey unit and a document discharge roller of the discharge unit in the second direction without physically disengaging driving gears.

44. The driving apparatus as claimed in claim 43, wherein the feed roller is disposed on the path and prevents a front end of the sheet from passing through the convey unit toward the discharge unit for a period of time during which the front end of the sheet is arranged with respect to the path.

45. The driving apparatus as claimed in claim 44, wherein the controller controls the feed roller to feed the sheet along the path toward the discharge unit after the period.

46. The driving apparatus as claimed in claim 43, wherein the control unit controls the pickup roller of the document supply unit to stop rotating during rotating the feed roller of the convey unit in one of the first and second directions.

47. The driving apparatus as claimed in claim 43, wherein the machine comprises an image scanning/printing unit scanning/printing an image from/on the sheet supplied along the path from the sheet supply unit in the sheet supplying direction, and the convey unit is disposed between the document supply unit and the image scanning/printing unit.

48. A driving apparatus for an image scanning/forming machine, comprising:
   a document supply unit having a pickup roller picking up and supplying a sheet along a path in a sheet supplying direction;
   a discharge unit discharging the sheet fed along the path;
   a convey unit disposed between the document supply unit and the discharge unit, and having a feed roller feeding the sheet toward the discharge roller;
   a sensor disposed between the document supply unit and the convey unit to detect a front end of the sheet, and generating a sensing signal; and a control unit controlling the feed roller of the convey unit to change a rotation direction between a first direction and a second direction in accordance with the sensing signal, wherein a driving motor rotates in a first direction to operate a pickup roller and a supply roller of the document supply unit, and power is transferred from the pickup roller and supply roller to drive the feed roller of the convey unit and a document discharge roller of the discharge unit in a second direction without physically disengaging driving gears.

49. A driving method for an image scanning/printing machine, the method comprising:

picking up and supplying a sheet along a path in a sheet supplying direction;

scanning/printing an image from/on the sheet supplied along the path from the sheet supply unit in the sheet supplying direction;

preventing a front end of the sheet from being fed to the image scanning/printing unit for a period of time to arrange the front end of the sheet with respect to the path; and feeding the sheet to the image scanning/printing unit after the period, wherein a driving motor rotates in a first direction to operate a pickup roller and a supply roller of a document supply unit, and power is transferred from the pickup roller and supply roller to drive a feed roller of a convey unit and a document discharge roller of a document discharge unit in a second direction without physically disengaging driving gears.

50. A driving method for an image scanning/printing machine having a pickup roller and a discharge roller, the method comprising:

picking up and supplying a sheet along a path in a sheet supplying direction using the pickup roller;

discharging the sheet fed along the path using the discharge roller;

disposing a feed roller between the pickup roller and the discharge roller;

feeding the sheet toward the discharge roller using the feed roller;

controlling the feed roller of the convey unit to rotate in first and second direction and to blocking a front end of the sheet from passing the feed roller toward the discharge roller for a period of time during which the front end of the sheet is arranged with respect to the path; and controlling the pickup roller of a document supply unit to rotate in one of first and second directions, wherein a driving motor rotates in the first direction to operate the pickup roller and a supply roller of the document supply unit, and power is transferred from the pickup roller and supply roller to drive the feed roller and the discharge roller in the second direction without physically disengaging driving gears.

51. A driving method for an image scanning/printing machine having a pickup roller and a discharge roller, the method comprising:

picking up and supplying a sheet along a path in a sheet supplying direction using the pickup roller;

discharging the sheet fed along the path using the discharge roller;

disposing a feed roller between a document supply unit and the discharge unit;

feeding the sheet toward the discharge roller using the feeding roller;

disposing a sensor between the document supply unit and the convey unit to detect a front end of the sheet and generate a sensing signal; and controlling the feed roller to change a rotation direction between a first direction and a second direction in accordance with the sensing signal, wherein a driving motor rotates in the first direction to operate the pickup roller and a supply roller of the document supply unit, and power is transferred from the pickup roller and supply roller to drive the feed roller and the discharge roller in the second direction without physically disengaging driving gears.

* * * * *

UNITED STATES PATENT AND TRADEMARK OFFICE
CERTIFICATE OF CORRECTION

PATENT NO. : 7,355,761 B2  Page 1 of 1
APPLICATION NO. : 10/420763
DATED : April 8, 2008
INVENTOR(S) : Myung-woo Yang It is certified that error appears in the above-identified patent and that said Letters Patent is hereby corrected as shown below:

Column 13, Line 10, before "allows" insert --unit--.

Column 14, Line 11, after "41" insert --,--.

Signed and Sealed this

Twenty-sixth Day of August, 2008

JON W. DUDAS
*Director of the United States Patent and Trademark Office*